(12) United States Patent
Schmitt (10) Patent No.: US 9,892,262 B2
(45) Date of Patent: Feb. 13, 2018

(54) ANALYZING TARGET SOFTWARE FOR SECURITY VULNERABILITIES

(71) Applicant: HEWLETT-PACKARD DEVELOPMENT COMPANY, L.P., Houston, TX (US)

(72) Inventor: Michael Jason Schmitt, Sunnyvale, CA (US)

(73) Assignee: EntIT Software, LLC, Sunnyvale, CA (US)

( * ) Notice: Subject to any disclaimer, the term of this patent is extended or adjusted under 35 U.S.C. 154(b) by 7 days.

(21) Appl. No.: 14/787,863

(22) PCT Filed: Jul. 12, 2013

(86) PCT No.: PCT/US2013/050331
§ 371 (c)(1),
(2) Date: Oct. 29, 2015

(87) PCT Pub. No.: WO2015/005936
PCT Pub. Date: Jan. 15, 2015

(65) Prior Publication Data
US 2016/0110549 A1    Apr. 21, 2016

(51) Int. Cl.
*G06F 21/00* (2013.01)
*G06F 21/57* (2013.01)
*G06F 9/45* (2006.01)
*G06F 9/44* (2006.01)

(52) U.S. Cl.
CPC .............. *G06F 21/577* (2013.01); *G06F 8/43* (2013.01); *G06F 8/77* (2013.01); *G06F 2221/033* (2013.01)

(58) Field of Classification Search
USPC ........................................................... 726/25
See application file for complete search history.

(56) References Cited

U.S. PATENT DOCUMENTS

| | | | |
|---|---|---|---|
| 6,895,577 B1 * | 5/2005 | Noble ................. | G06F 11/3676 714/38.12 |
| 7,779,399 B2 | 8/2010 | Huang et al. | |
| 7,975,306 B2 | 7/2011 | Chess et al. | |
| 8,392,997 B2 | 3/2013 | Chen et al. | |
| 2005/0223361 A1 * | 10/2005 | Belbute .............. | G06F 11/3688 717/124 |
| 2008/0209567 A1 | 8/2008 | Lockhart et al. | |
| 2008/0229423 A1 | 9/2008 | Hall et al. | |
| 2009/0100410 A1 | 4/2009 | Pouliot | |
| 2009/0144698 A1 | 6/2009 | Fanning et al. | |
| 2011/0030061 A1 | 2/2011 | Artzi et al. | |

(Continued)

OTHER PUBLICATIONS

Gegick, M., et al., Prioritizing Software Security Fortification Through Code-level Metrics, Oct. 27, 2008, QoP '08, pp. 31-37.

(Continued)

*Primary Examiner* — Jason Lee (57) ABSTRACT

A method of analyzing target software for security vulnerabilities comprises, with a processor, scanning a codebase of a target software using a static analysis scan to identify a number of security flaws, and calculating a number of code metrics of the codebase of the target software for a number of iterations over a period of time to obtain a number of historical scans.

13 Claims, 3 Drawing Sheets

(56) References Cited

U.S. PATENT DOCUMENTS

| | | | |
|---|---|---|---|
| 2011/0093955 A1* | 4/2011 | Chen .................... | G06F 21/577 |
| | | | 726/25 |
| 2012/0072968 A1* | 3/2012 | Wysopal ............ | G06F 11/3612 |
| | | | 726/1 |
| 2012/0254829 A1 | 10/2012 | Bhalla et al. | |

OTHER PUBLICATIONS

International Search Report & Written Opinion, Apr. 10, 2014, PCT Patent Application No. PCT/US2013/050331, 12 pages.

* cited by examiner

ANALYZING TARGET SOFTWARE FOR SECURITY VULNERABILITIES

BACKGROUND

Businesses are increasingly dependent on information technology. Information systems are becoming increasingly more complex, higher-powered, inter-connected. and openly accessible to partners and customers over vastly distributed networks. The business environment has increasingly shifted from face-to-face interactions to largely anonymous electronic transactions. Software development itself is becoming more distributed through offshore development arrangements and intra-company collaborative computing. These trends strain the ability of organizations to secure and protect digital data from misuse or unauthorized access. The security threats and risks involved in the use of these computer technologies may prove to be an economic liability to any individual or in any organization that must rely on the technology to achieve personal and business goals.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

While the frequency of security attacks against software and the applications they enable increases constantly, it may be difficult to identify all of the security vulnerabilities that exist in software. Security is an emergent property of software in that it is the byproduct of the design and engineering of the software rather than an intentional designed aspect built into the software. For this reason, software development and security teams rely on analysis techniques and manual testing that attempt and often fail to strike a balance between complete coverage of the system, and high-fidelity accuracy in the results. Most of the analysis and testing is performed after the software is already built, when it is too late, too expensive, or too organizationally difficult to justify fixing the security vulnerabilities. Software development and security teams would benefit from having a way to understand how the security of software evolves over time, in order to predict where security flaws will emerge. If such an understanding were available, the software and development teams could prioritize where to focus their time and effort on remediating these security flaws.

Currently, software development and security teams operate blindly in connection with addressing potential security flaws concurrently with the development of the software. This creates an environment where the software development and security teams rely on guesswork as to where and when to focus on addressing security flaws in the software being developed. Nearly every major business critical application deployed today contains vulnerabilities that can be exploited to cause considerable harm to the business or the assets it manages. These vulnerabilities can be leveraged to steal important information, sabotage computer systems, or influence processing for the profit or malicious intent of the attacker.

For an experienced hacker or rogue insider, manipulating software to this end is made especially easy due to the variety of information and tools available on-line. An attacker's biggest challenge is simply finding the vulnerabilities in the context of a large business application. Further, mainstream computer security solutions, such as firewalls, are based on the premise that exposed and vulnerable software can be protected by isolating it from the dangers of the outside world. Business requirements dictate that few business critical applications can be truly isolated. Most have numerous access points via data transfer interfaces, remote procedure calls, and internal and remote users. Firewalls and other network-oriented security solutions do not block the type of access that business critical applications require. In fact, today's business functions rely on this access to the extent that they would fail to operate if denied. Attackers make use of these facts to compromise systems every day.

In light of the above, a question naturally presents itself: Why are network-based computer security solutions applied to what is clearly a software problem? One answer is that most information security practitioners have network security backgrounds and are spread thin resolving operational security issues, leaving little time to interact with the core software development process. At the same time, application developers are rewarded for producing new features against tight deadlines, while devoting very little resources to security considerations. Rarely does any one person own responsibility for the security elements of the application itself. In most cases, software development gets the business critical application shipped, and network operation teams will secure it. The dichotomy of these roles creates an extraordinary advantage for the attacker who may ironically be the only ones truly experienced and focused on software security and the vulnerabilities of business critical applications.

Experts in and around software development have increasingly acknowledged that something must be done about software security. Nevertheless, coherent and practical solutions have not been identified. There are a number of factors that make solutions difficult to identify. For example, software security vulnerabilities are subtle, logical errors that can span thousands of lines of code, making accurate detection with reasonable performance extremely difficult. At first glance, the technology challenges make such a solution appear more akin to compilers or niche development tools. The large software development tool vendors, however, have not made security a core part of their offerings. Their customer base is still largely focused on how to improve creation of features and functionality, and the vendors' internal teams cannot easily recognize a changing paradigm while they work to improve the feature sets of their single-purpose products. This is a common software innovator's dilemma. In addition, the high volume development tool providers are not adept at delivering enterprise-like solutions that a risk management system requires, or sustaining the price points needed to support such a solution. Indeed, the current state of development tool pricing has generally discouraged the security community from building developer-oriented solutions.

Apart from the downsides inherent in software development tools, software security may require specialized expertise in a constantly changing field. The problem is not just about finding technology to scan code, but includes creating and continually updating rules to detect vulnerabilities. Delivering the rules requires expert knowledge of a constantly growing body of research and real-world architectures, frameworks, use patterns and many other factors that cause vulnerabilities in business critical applications. For example, every release of an operating system or library application program interfaces (APIs) introduces new ways to make mistakes that lead to security vulnerabilities.

Further, it is unlikely that software security can be accomplished by a single point solution. Similarly, it is unlikely that software security can be addressed solely at the developer level. Software security is largely a risk management problem. Addressing the above situations may include detailed information collected over time, and an approach that keeps software developers as productive as before, yet makes security metrics visible to management during development, testing, and deployment. Addressing the above situations may also include an enterprise software-like solution for managers and organizations.

Disclosed herein are methods and systems for predicting and prioritizing software security flaws by analyzing and correlating a number of sources of software information over a period time. These sources of software information may include, for example, static analysis security vulnerability results, software code complexity and stability metrics, and runtime security information about vulnerabilities, frequency of access, and frequency of attack, among others.

As used in the present specification and in the appended claims, the term "target software" or similar language is meant to be understood broadly as any software and its associated code that is analyzed to detect security flaws.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
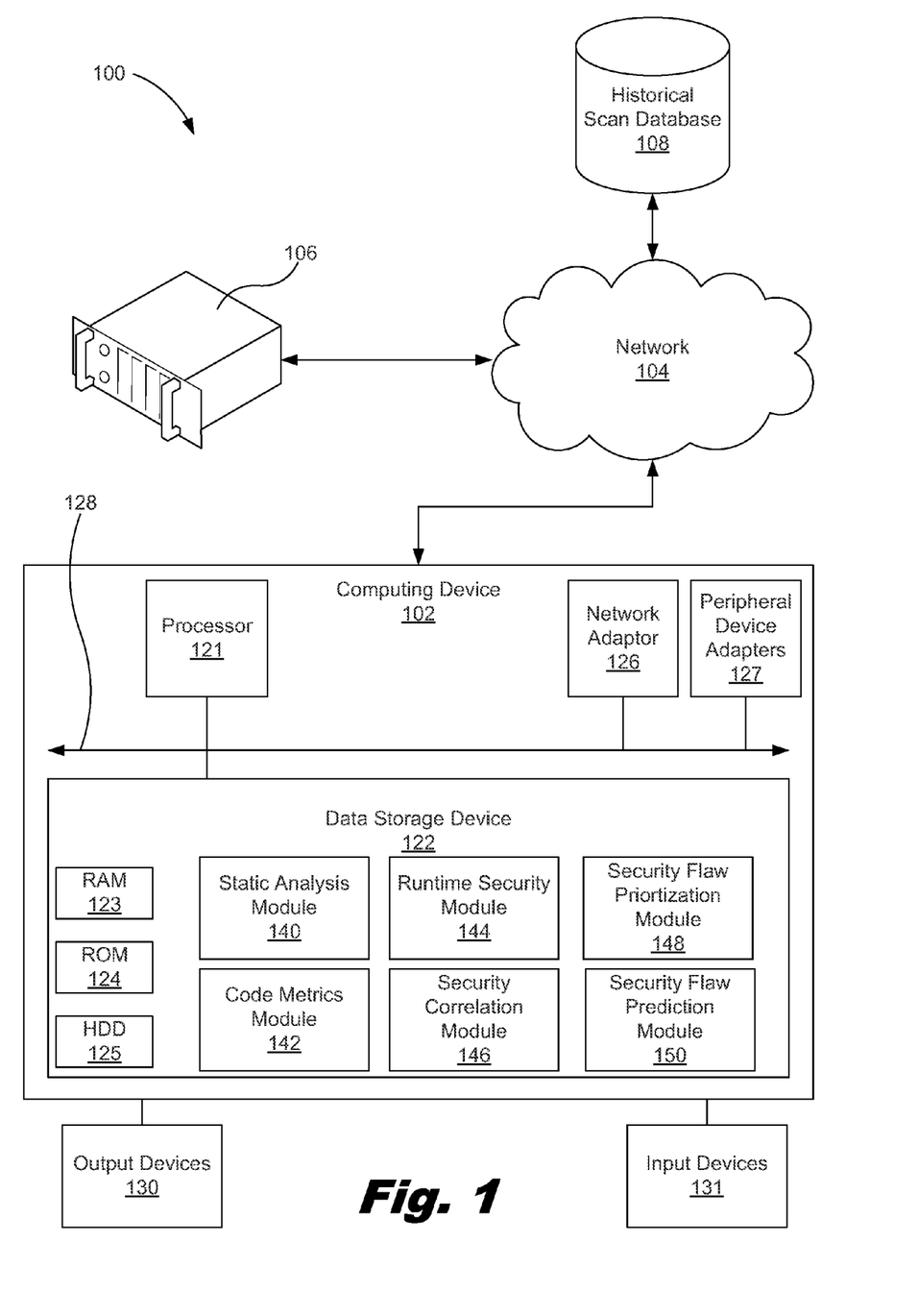
FIG. 1 is a block diagram of a system for predicting software security flaws, according to one example of the principles described herein.

FIG. 1 is a block diagram of a system (100) for predicting software security flaws, according to one example of the principles described herein. The system may comprise a computing device (102), an application server (106), and a historical scan database (108). In one example, the computing device (102), application server (106), and historical scan database (108) may communicate with each other via a network (104). In another example, the computing device (102), application server (106), and historical scan database (108) may be directly coupled to each other without an intermediary network (104), In still another example, the computing device (102), application server (106), and historical scan database (108) may be integrated together in a number of devices. The network (104) may be a local area network, an intranet, or the Internet, among other forms of networks.

The system (100) may be utilized in any data processing scenario including, for example, a cloud computing service such as a Software as a Service (SaaS), a Platform as a Service (PaaS), a Infrastructure as a Service (IaaS), application program interface (API) as a service (APIaaS), other forms of network services, or combinations thereof. Further, the system (100) may be used in a public cloud network, a private cloud network, a hybrid cloud network, other forms of networks, or combinations thereof. In one example, the methods provided by the system (100) are provided as a service over a network by, for example, a third party. In another example, the methods provided by the system (100) are executed by a local administrator. Further, the system (100) may be utilized within a single computing device. In this data processing scenario, a single computing device may utilize the devices and associated methods described herein to identify, prioritize, and predict security flaws during and after development of the software.

To achieve its desired functionality, the computing device (102) comprises various hardware components. Among these hardware components may be a number of processors (121), a number of data storage devices (122), a number of peripheral device adapters (127), and a number of network adapters (126). These hardware components may be interconnected through the use of a number of busses and/or network connections. in one example, the processor (121), data storage device (122), peripheral device adapters (127), and a network adapter (126) may be communicatively coupled via bus (128).

The processor (121) may include the hardware architecture to retrieve executable code from the data storage device (122) and execute the executable code. The executable code may, when executed by the processor (121), cause the processor (121) to implement at least the functionality of identifying, prioritizing, and predicting security flaws during and after development of the software, according to the methods of the present specification described herein. In the course of executing code, the processor (121) may receive input from and provide output to a number of the remaining hardware units.

The data storage device (122) may store data such as executable program code that is executed by the processor (121) or other processing device. As will be discussed, the data storage device (122) may specifically store a number of applications that the processor (121) executes to implement at least the functionality described herein.

The data storage device (122) may include various types of memory modules, including volatile and nonvolatile memory. For example, the data storage device (122) of the present example includes Random Access Memory (RAM) (123), Read Only Memory (ROM) (124), and Hard Disk Drive (HDD) memory (125). Many other types of memory may also be utilized, and the present specification contemplates the use of many varying type(s) of memory in the data storage device (122) as may suit a particular application of the principles described herein. In certain examples, different types of memory in the data storage device (122) may be used for different data storage needs. For example, in certain examples the processor (121) may boot from Read Only Memory (ROM) (124), maintain nonvolatile storage in the Hard Disk Drive (HDD) memory (125), and execute program code stored in Random Access Memory (RAM) (123).

Generally, the data storage device (122) may comprise a computer readable medium, a computer readable storage medium, or a non-transitory computer readable medium, among others. For example, the data storage device (122) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (126, 127) in the system (100) enable the processor (121) to interface with various other hardware elements, external and internal to the system (100). For example, peripheral device adapters (127) may provide an interface to input (130) and output (131) devices, such as, for example, keyboards, mice, printing devices, and display devices, among other input/output devices. Further, the peripheral device adapters (127) may provide an interface to access other external devices such as an external storage device. The input (130) and output (131) devices may be provided to allow a user to interact with and implement the functionality of the system (100). The network adapter (126) may provide an interlace to other computing devices within, for example, a network, thereby enabling the transmission of data between the computing device (102) and other devices located within the network.

The computing device (102) further comprises a number of modules (140, 142, 144, 146, 148, 150) used in identifying, prioritizing, and predicting security flaws during and after development of the software. The various modules within the computing device (102) may be executed separately. In this example, the various modules may be stored as separate computer program products. In another example, the various modules within the computing device (102) may be combined within a number of computer program products; each computer program product comprising a number of the modules. In one example, the modules (140, 142, 144, 146, 148, 150) are stored within the data storage device (122) of the system (100), and are accessible and executable by the processor (121). in another example, the modules (140, 142, 144, 146, 148, 150) are stored and executed on, for example, a server device such as server (106) via a cloud computing service for the benefit of a user of the system (100) as described above. In still another example, the modules (140, 142, 144, 146, 148, 150) are stored and executed on a data storage device such as, for example, historical scan database (108). In still another example, the modules (140, 142, 144, 146, 148, 150) are stored and executed on various computing devices such as the computing device (102), the server (106), or the historical scan database (108) as a group of modules (140, 142, 144, 146, 148, 150) or as separate groups or individual modules. However, for ease of explanation, the modules (140, 142, 144, 146, 148, 150) will be described herein as being stored and executed on the computing device (102).

The computing device (102) may comprise a static analysis module (140) to, when executed by the processor (121), analyze target software for security vulnerabilities without executing the software. In one example, the static analysis module (140) performs a data flow analysis on a codebase of the target software to identify a number of program locations where inputs are taken from the outside world such as, for example, via user inputs. The static analysis module (140) traces the instances of inputs through the assignments, function calls, and operations performed by the target software. This process may be referred to as "taint propagation." A number of coding rules may be applied along with the data flow analysis. These coding rules indicate a security violation for a tainted value within the data flow analysis. The computing device (102) reports the resultant number of security violations based on the data flow analysis and the coding rules. In one example, the static analysis scans obtained by the static analysis module (140) are stored in a data storage device such as, for example, the historical scan database (108).

The computing device (102) may further comprise a code metrics module (142) to, when executed by the processor (121), measure a number of code metrics. In one example, the code metrics module (142) measures the program complexity such as, for example, cyclomatic complexity, code reuse defined as how frequently a portion of the code is reused or invoked by other parts, code churn that defines a measure of changes in code over time, other code metrics, and combinations thereof. In another example, the code metrics are non-security related attributes of the codebase. These code metrics suggest disproportionate complexity, exposure, or instability in a particular part of the code. The computing device (102) stores the code metrics measured by the code metrics module (142) in a data storage device such as, for example, the historical scan database (108).

The computing device (102) may further comprise a runtime security module (144) to, when executed by the processor (121), obtain runtime security information from the runtime environment of a version of the target software. The runtime security information may comprise security vulnerabilities detected by dynamic analysis or manual testing of the running application, environmental configuration and behavioral characteristics of the application in the runtime environment, such as, for example, how often a particular area of the test software is accessed or attacked, other runtime security information, and combinations thereof. In one example, the runtime security information obtained by the runtime security module (144) is stored in a data storage device such as, for example, the historical scan database (108).

The computing device (102) may further comprise a security correlation module (146) to, when executed by the processor (121), analyze a number of correlations between security flaw evolution as indicated by the data obtained by the static analysis module (140) and runtime security module (144), and a number of the code metrics obtained by the code metrics module (142). The static analysis scans obtained by the static analysis module (140), the runtime security information obtained by the runtime security module (144), and the code metrics obtained by the code metrics module (142) are stored in the a data storage device such as, for example, the historical scan database (108) as described above. The security correlation module (146) combines each of these three security data sources, the static analysis results, the software code metrics, and the runtime security information, over a number of scans over a period of time. Combining this information into a single analytics platform will enable the present systems and methods to achieve a number of goals as described herein.

The computing device (102) may further comprise a security flaw prioritization module (148) to, when executed by the processor (121), prioritize security vulnerabilities discovered in static analysis by correlating the security vulnerabilities with areas of the target software that are known to be complex or unstable, observe patterns of security flaws over time to remove or de-prioritize issues that are not consistently deterministic such as, for example, issues that seem to come and go, raise the priority of issues that emerge in areas of the target software that show significant reuse, and raise the priority of issues that occur in areas of the target software known to be frequently accessed or to be vulnerable in the runtime environment. In one example, the security flaw prioritization information obtained by the security flaw prioritization module (148) is stored in a data storage device such as, for example, the data storage device (122) of the computing device (102), or the historical scan database (108).

The computing device (102) may further comprise a security flaw prediction module (150) to, when executed by the processor (121), correlate the rate of emergence of security vulnerabilities in areas of the code of the target software that show high complexity or churn to predict and alert that an area of the code is trending toward becoming more at risk, correlate the rate of emergence of security vulnerabilities in areas of the code of the target software that show frequent access or security attacks in the runtime environment, and predict security flaws in the target software based on patterns of correlation between software code complexity and stability metrics and discovered security flaws in past analyses. In one example, the security flaw prediction information obtained by the security flaw prediction module (150) is stored in a data storage device such as, for example, the data storage device (122) of the computing device (102), or the historical scan database (108).

Figure 2:
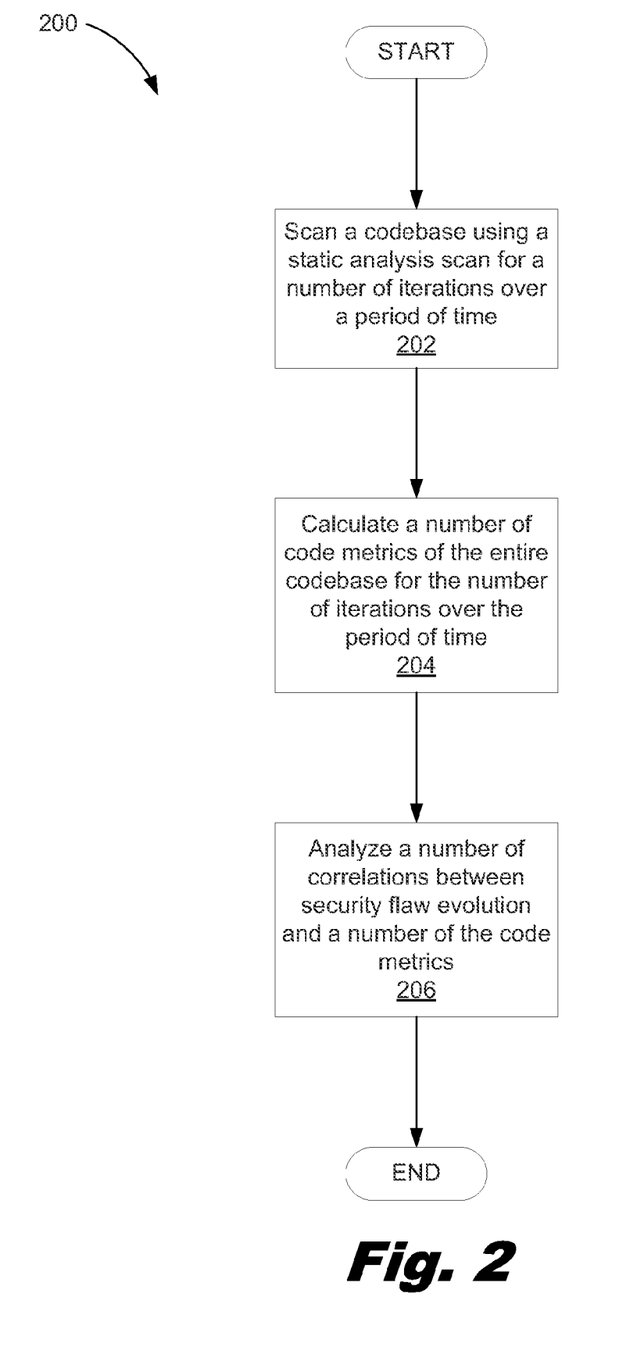
FIG. 2 is a flowchart showing a method of analyzing target software for security vulnerabilities, according to one example of the principles described herein.

FIG. 2 is a flowchart showing a method (200) of analyzing target software for security vulnerabilities, according to one example of the principles described herein. The method (200) of FIG. 2 may begin by scanning (block 202), with the processor (FIG. 1, 121) executing the static analysis module (140), a codebase using a static analysis scan for a number of iterations over a period of time. As described above, the static analysis module (FIG. 1, 140) performs a data flow analysis on a codebase to identify a number of program locations where inputs are taken from the outside world such as, for example, via user inputs. The static analysis module (FIG. 1, 140) traces the instances of inputs through the assignments, function calls, and operations performed by the target software. A number of coding rules may be applied along with the data flow analysis. These coding rules indicate a security violation for a tainted value within the data flow analysis. In one example, the computing device (FIG. 1, 102) reports the resultant number of security violations based on the data flow analysis and the coding rules.

The method (200) may proceed by calculating (block 204), with the processor (FIG. 1, 121) executing the code metrics module (142), a number of code metrics of the codebase for the number of iterations over the period of time. In one example, the processor (FIG. 1, 121) calculates (block 204) a number of code metrics of the entire codebase. In one example, the code metrics may be any measure of software code quality which indicates the complexity, understandability, testability, description, and intricacy of the code. In one example, the code metrics may comprise cyclomatic complexity of the target software, code reuse defined as how frequently a portion of the code is reused or invoked by other parts, code churn that defines a measure of changes in code over time, other code metrics, and combinations thereof. In another example, the code metrics are non-security related attributes of the codebase.

The processor (FIG. 1, 121), executing the security correlation module (146), analyzes (block 206) a number of correlations between security flaw evolution and a number of the code metrics. The security correlation module (146) combines each of these three security data sources, the static analysis results, the software code metrics, and the runtime security information, over a number of scans over a period of time. In one example, the processor (FIG. 1, 121) outputs the analysis determined by the security correlation module (146) to an output device (FIG. 1, 130) for review by a user. In this manner the user, being, for example, the developer of the target software, may use the analysis provided by the security correlation module (146) to prioritize target software code changes associated with security flaws, predict software security flaws in the target software code, or combinations thereof.

Figure 3:
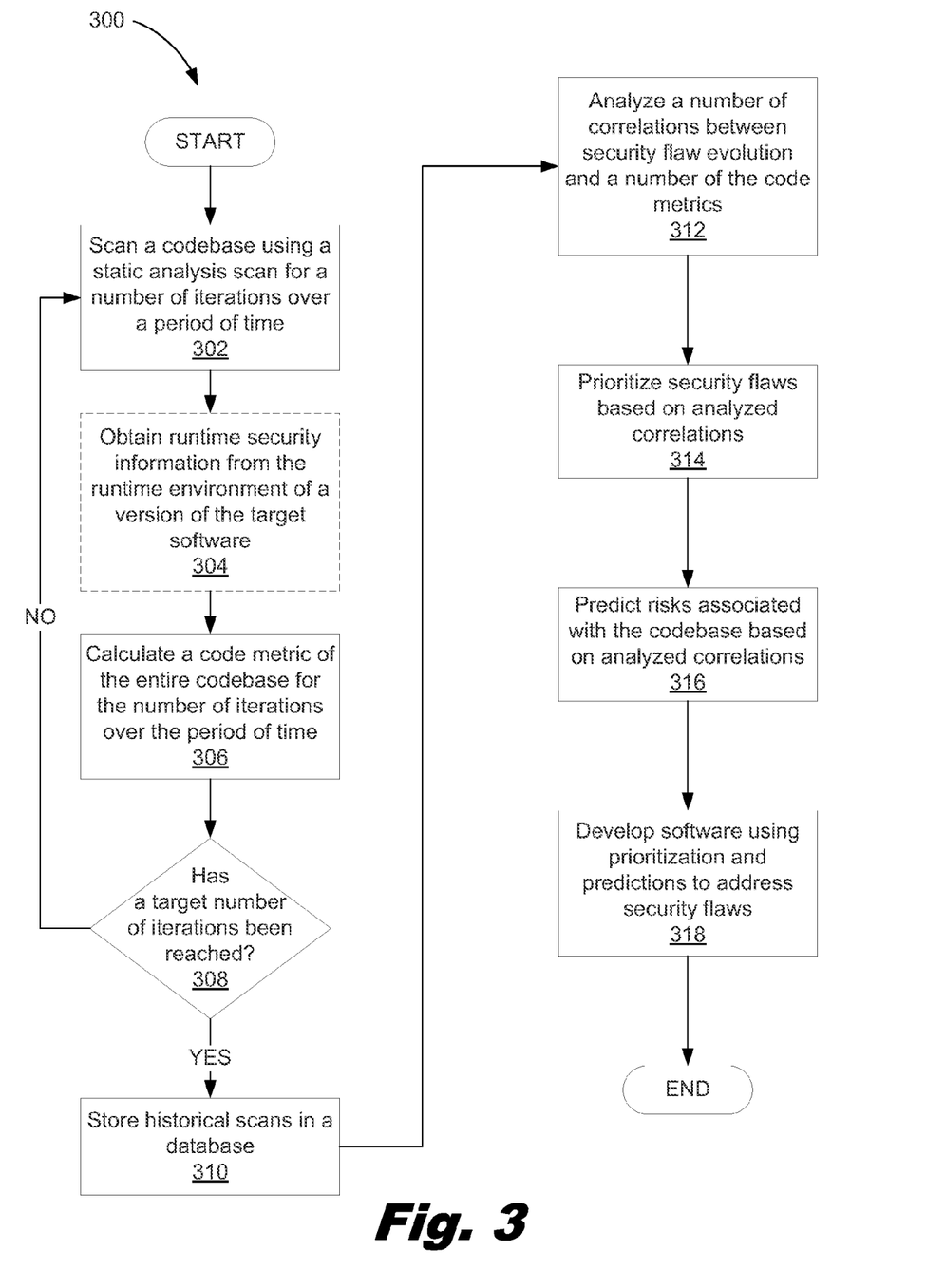
FIG. 3 is a flowchart showing a method of analyzing target software for security vulnerabilities, according to another example of the principles described herein.

FIG. 3 is a flowchart (300) showing a method of analyzing target software for security vulnerabilities, according to another example of the principles described herein. The method (300) of FIG. 3 may begin by scanning (block 302), with the processor (FIG. 1, 121) executing the static analysis module (140), a codebase using a static analysis scan for a number of iterations over a period of time as described above in connection with FIG. 2.

The processor (FIG. 1, 121), executing the runtime security module (144), obtains (block 304) runtime security information from the runtime environment of a version of the target software, as described above in connection with FIG. 2. In one example, the obtaining (block 304) of runtime security information from the runtime environment of a version of the target software is optional as indicated by the dashed lines in surrounding block 304, Obtaining (block 304) runtime security information from the runtime environment of a version of the target software enhances the functionality of the present systems and methods by providing additional analytical data, but is not required for prioritization (FIG. 3, block 314) of security flaws and prediction (FIG. 3, block 316) of risks associated with the codebase as will be discussed in more detail below.

The method (300) may proceed by calculating (block 306), with the processor (FIG. 1, 121) executing the code metrics module (142), a number of code metrics of the codebase for the number of iterations over the period of time, as described above in connection with FIG. 2. The computing device (102) determines (block 308) if a target number of iterations of obtaining statistical data (i.e., the static analysis results, the software code metrics, and the runtime security information) via blocks 302, 304, and 306 have been reached. In one example, a user may define the number of iterations the computing device (102) is to take in obtaining the statistical data. In another example, the number of iterations the computing device (102) is to take in obtaining the statistical data is defined by the security correlation module (FIG. 1, 146). Any number of iterations may be performed in order to obtain the static analysis results, the software code metrics, and the runtime security information. In one example, the number of iterations is a plurality of iterations. In one example, the number of iterations may be between 1 and 1,000. In another example, the number of iterations may be between 10 and 100. However, any number of iterations of obtaining statistical data via blocks 302, 304, and 306 may be performed.

In another example, the number of iterations the computing device (102) is to take in obtaining the statistical data may be performed with a user- or a security-correlationmodule—(FIG. 1, 146) defined time period between iterations. In this example, a number of iterations of obtaining statistical data via blocks 302, 304, and 306 may be performed among a number of regular or irregular occurrences, with a regular or irregular intermediate time periods between occurrences. In one example, the number of iterations of obtaining statistical data via blocks 302, 304, and 306 may be performed on a regular schedule such as, for example, daily, weekly, monthly, or yearly. In another example, the number of iterations of obtaining statistical data via blocks 302, 304, and 306 may be performed at irregular times such as instances when processing resources are made available. In another example, the number of iterations of obtaining statistical data via blocks 302, 304, and 306 may be performed at regular intervals with a number of seconds, minutes, hours, days, weeks, months, or portions thereof between instances. In still another example, the number of iterations of obtaining statistical data via blocks 302, 304, and 306 may be performed based on a combination of the above temporal parameters. In still another example, the number of iterations of obtaining statistical data via blocks 302, 304, and 306 may be performed based on a combination of a defined number of iterations and over a defined period of time.

If the target number of iteration has not been met (block 308, Determination NO), then the method returns to block 302. If, however, the target number of iteration has been met (block 308, Determination YES), then the method continues with additional processing. In one example, the method may proceed with the computing device (102) storing (block 310) the statistical data in a database. The statistical data may be referred to as historical scans. In one example, the historical scans are stored in the historical scan database (108) for later processing. In one example, the process of block 310 may be performed at any time data is obtained by the system (FIG. 1, 100). In one example, the historical scans may be stored after individual iterations of the blocks 302, 304, and 306, or after obtaining the static analysis results, the software code metrics, and the runtime security information individually.

The processor (FIG. 1, 121), executing the security correlation module (FIG. 1, 146), analyzes (block 312) a number of correlations between security flaw evolution and a number of the code metrics as described above in connection with block 206 of FIG. 2. The security correlation module (146) combines each of the three security data sources, the static analysis results, the software code metrics, and the runtime security information, over a number of scans over a period of time.

A security flaw prioritization module (148), when executed by the processor (FIG. 1, 121), prioritizes (block 314) security flaws identified by the security correlation module (146) at block 312 to assist a developer of the target software in determining the greatest security threats present within or created by the target software. In one example, the prioritized security flaws are presented to a user via the output devices (130). In this example, the security flaws may be presented on the output devices (130) in an order indicating a security flaw of highest priority. The security flaw prioritization module (148) prioritizes security vulnerabilities discovered in the static analysis scans obtained by the static analysis module (140) by correlating the vulnerabilities with areas of the target software that are known to be complex or unstable. Further, the security flaw prioritization module (148) observes patterns of security flaws over time to remove or de-prioritize; potential security flaws that are not consistently deterministic; those security flaws that come and go. Still further, the security flaw prioritization module (148) raises the priority of issues that emerge in areas of the target software that show significant reuse. Even still further, the security flaw prioritization module (148) raises the priority of issues that occur in areas of the target software that are frequently accessed or are vulnerable in the runtime environment.

The method may continue with the processor (121), executing the security flaw prediction module (150), predicting a number of security flaws within the code of the target software. In one example, the security correlation module (146) correlates the rate of emergence of security vulnerabilities in areas of the code that show high complexity or churn, and the security flaw prediction module (150) uses this information to predict and alert a user that an area of the code is trending toward becoming more at risk. In another example, the security correlation module (146) correlates the rate of emergence of security vulnerabilities in areas of the code that show frequent access or security attacks in the runtime environment and the security flaw prediction module (150) uses this information to predict and alert a user that an area of the code is trending toward becoming more at risk. In still another example, the security flaw prediction module (150) predicts security flaws in the software based on patterns of correlation between software code complexity and stability metrics, and discovered security flaws within the data contained within the historical scan database (108).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (121) of the computing device (102) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe methods and systems for analyzing target software for security vulnerabilities. The present systems and methods scan a codebase of a target software using a static analysis scan to identify a number of security flaws, and calculate a number of code metrics of the codebase of the target software for a number of iterations over a period of time to obtain a number of historical scans. A number of correlations between security flaw evolution and a number of the code metrics are analyzed to prioritize a number of security flaws based on the correlations between the security flaw evolution and the code metrics and predict risks associated with the codebase based on the correlations between the security flaw evolution and the code metrics.

The present systems and methods may have a number of advantages, including: (1) providing for the ability to prioritize security vulnerabilities discovered in static analysis by correlating the vulnerabilities with areas of the application that are known to be complex or unstable; (2) providing for the ability to observe patterns of security flaws over time to remove/de-prioritize issues that are not consistently deterministic, such as, for example, issues that are elusive or seem to come and go; (3) providing for the ability to raise the priority of issues that emerge in areas of the application that show significant reuse; (4) providing for the ability to raise the priority of issues that occur in areas of the application known to be frequently accessed or to be vulnerable in the runtime environment; (5) correlate the rate of emergence of security vulnerabilities in areas of the code that show high complexity or churn, to predict and alert that an area of the code is trending toward becoming more at risk; (6) correlate the rate of emergence of security vulnerabilities in areas of the code that show frequent access or security attacks in the runtime environment; and (7) predict security flaws in the software based on patterns of correlation between software code complexity and stability metrics, discovered security flaws in past analyses, etc., among other advantages The preceding description has been presented to illustrate and describe examples of the principles described. This description is not intended to be exhaustive or to limit these principles to any precise form disclosed. Many modifications and variations are possible in light of the above teaching.

What is claimed is:

1. A method of analyzing target software for security vulnerabilities comprising, with a hardware processor:
at each of a plurality of iterations over a period of time:
scanning a codebase of a target software using a static analysis scan to identify security flaws;
obtaining runtime security information from a runtime environment of a version of the target software; and
calculating code metrics of the codebase of the target software;
analyzing correlations between the security flaws, the runtime security information, and the code metrics over the period of time; and
prioritizing the security flaws based on the correlations.

2. The method of claim 1, further comprising predicting risks associated with the codebase based on the correlations between the security flaws and the code metrics over the period of time.

3. The method of claim 1, further comprising storing the security flaws identified at each iteration and the code metrics calculated at each iteration as historical scans in a historical scan database.

4. The method of claim 1, further comprising prioritizing the security flaws identified using the static analysis scan over the period of time that are correlated with unstable or complex areas of the codebase of the target software as identified by the code metrics over the period of time.

5. The method of claim 1, further comprising deprioritizing the security flaws identified using the static analysis scan that are inconsistently deterministic over the period of time.

6. The method of claim 1, further comprising prioritizing the security flaws identified using the static analysis scan over the period of time that are correlated with reused areas of the codebase of the target software as identified by the code metrics over the period of time.

7. A system for analyzing target software for security vulnerabilities comprising:
a hardware processor;
a data storage device coupled to the processor, the data storage device storing instructions executable by the hardware processor to:
scan a codebase of a target software to identify security flaws at each of a plurality of iterations over a period of time;
obtain runtime security information of the target software at each iteration over the period of time;
calculate code metrics of the codebase of the target software at each iteration over the period of time;
analyze correlations among the security flaws, the runtime security information, and the code metrics; and
prioritize the security flaws based the correlations among the security flaws, the runtime security information, and the code metrics; and
a historical scan database for storing the security flaws, the runtime security information, and the code metrics at each iteration as historical scans.

8. The system of claim 7, wherein the instructions are executable by the hardware processor to further predict risks associated with the codebase based on the correlations among the security flaws, the runtime security information, and the code metrics.

9. The system of claim 7, further comprising a server, in which the functionality of the system is provided as a Software as a Service (SaaS), a Platform as a Service (PaaS), a Infrastructure as a Service (IaaS), an application program interface (API) as a service (APIaaS), or combinations thereof via the server.

10. A computer program product for analyzing target software for security vulnerabilities, the computer program product comprising:
a non-transitory computer readable storage medium comprising computer usable program code embodied therewith, the computer usable program code executable by a hardware processor to:
analyze correlations among static analysis scans identifying security flaws, code metrics, and runtime security scans determined from target software at each of a plurality of iterations over a period of time; and
prioritize the security flaws based on the correlations.

11. The computer program product of claim 10, wherein the computer usable program code is executable by the hardware processor to further predict security flaws associated with the target software based on the correlations.

12. The computer program product of claim 10, wherein the computer usable program code is executable by the hardware processor to further:
at each iteration over the period of time, scan a codebase of the target software using static analysis to identify the security flaws in the static analysis scans; and
at each iteration over the period of time, calculate the code metrics of the codebase of the target software.

13. The computer program product of claim 10, wherein the computer usable program code is executable by the hardware processor to further at each iteration over the period of time, obtain runtime security information from a runtime environment of the target software.

* * * * *